G. ROBERTSON.
FLYING MACHINE.
APPLICATION FILED FEB. 11, 1918.

1,302,435.

Patented Apr. 29, 1919.
3 SHEETS—SHEET 1.

Inventor.
Geo. Robertson.

G. ROBERTSON.
FLYING MACHINE.
APPLICATION FILED FEB. 11, 1918.

1,302,435.

Patented Apr. 29, 1919.
3 SHEETS—SHEET 3.

Inventor
Geo. Robertson.
EW Anderson & Son
Attys.

UNITED STATES PATENT OFFICE.

GEORGE ROBERTSON, OF DURANGO, COLORADO.

FLYING-MACHINE.

1,302,435. Specification of Letters Patent. Patented Apr. 29, 1919.

Application filed February 11, 1918. Serial No. 216,520.

*To all whom it may concern:*

Be it known that I, GEORGE ROBERTSON, citizen of the United States, resident of Durango, in the county of La Plata and State of Colorado, have made a certain new and useful Invention in Flying-Machines; and I declare the following to be a full, clear, and exact description of the same, such as will enable others, skilled in the art to which it appertains to make and use the invention, reference being had to the accompanying drawings, and to letters or figures of reference marked thereon, which form a part of this specification.

Figure 1:
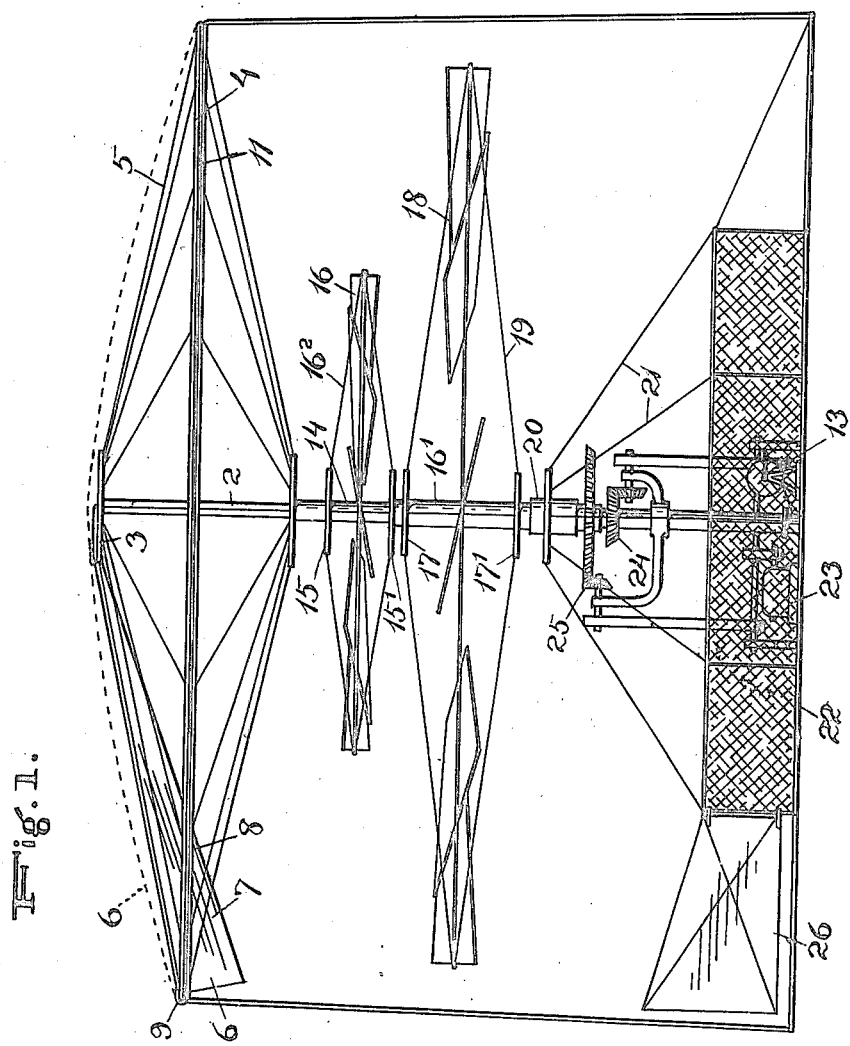
Figure 1 is a side view of the machine with the parachute folded and the spread position thereof in dotted lines.
Figure 2:
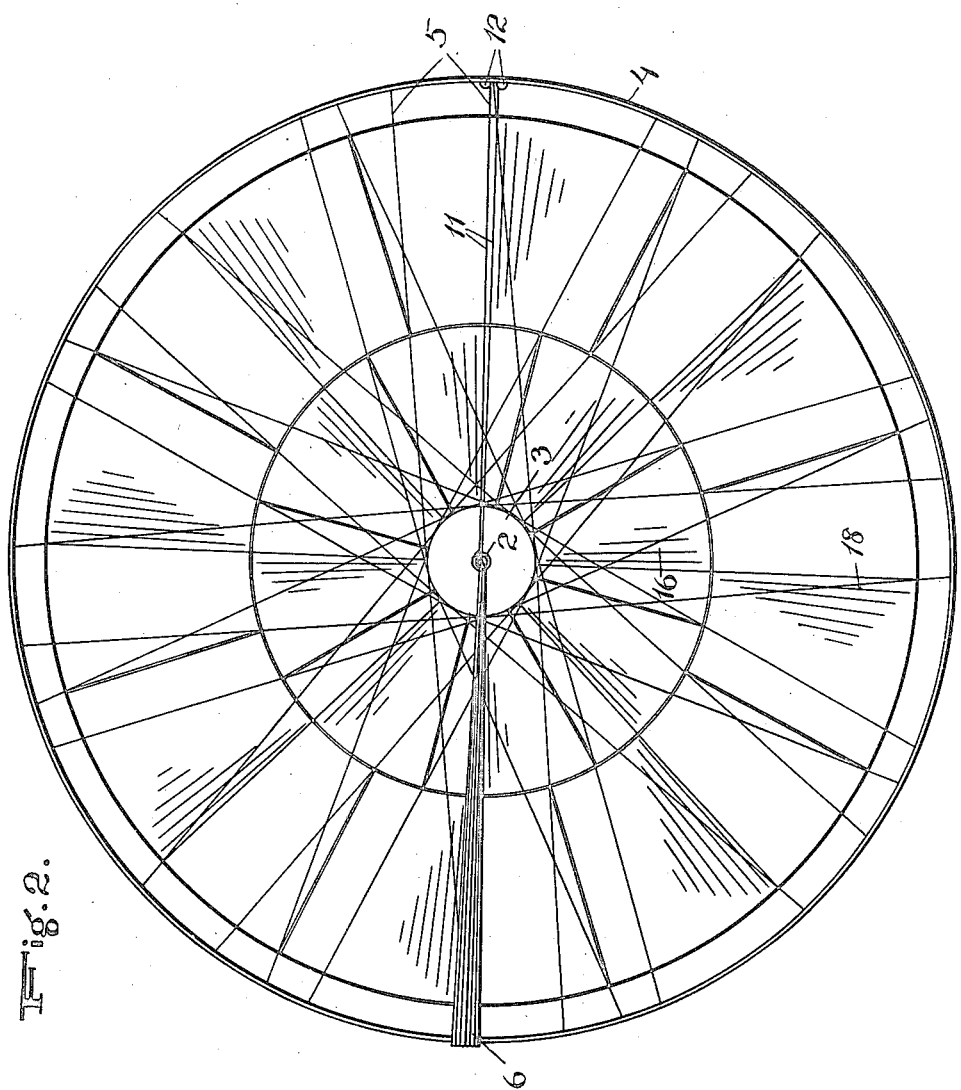
Fig. 2 is a plan view of the machine with the parachute folded.
Figure 3:
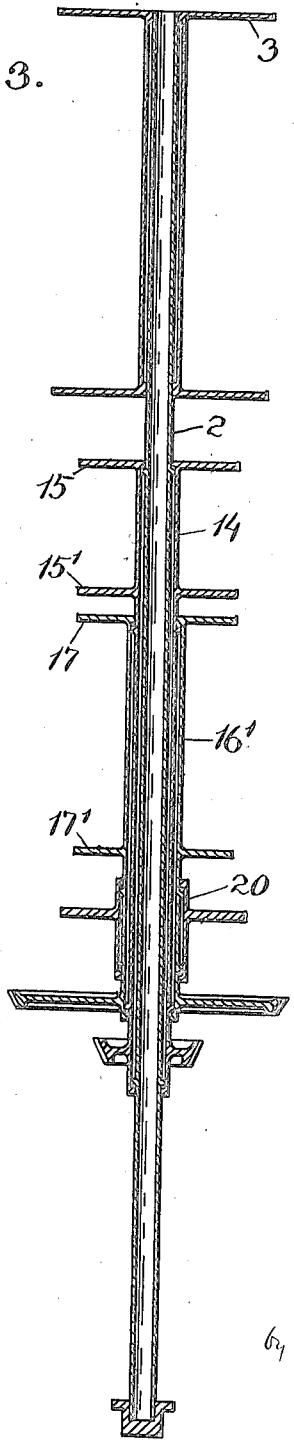
Fig. 3 is a detail central longitudinal section of the four concentric tubes.
Figure 5:
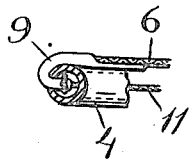
Fig. 5 is a section on the line 5—5, Fig. 4.
Figure 4:
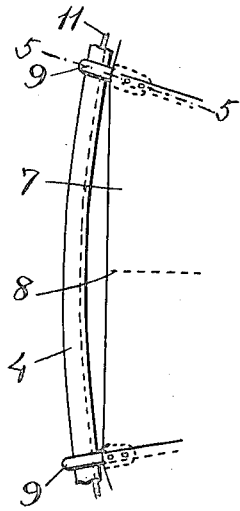
Fig. 4 is a detail fragmentary plan view of one of the sector sections and the parts adjacent thereto.

The invention has relation to flying machines, and it consists in the novel construction and combinations of parts, as hereinafter set forth.

In the accompanying drawings, illustrating the invention, the numeral 2 designates a stationary center tube, having preferably an upper flange 3, carrying an outer ring or annulus 4 of large diameter, radial or substantially radial braces 5 rigidly connecting this ring with said flange and serving to hold the ring in position.

A parachute 6 is composed of any suitable number of flat sector-shaped sections 7, connected along all but one of their radial lines of juncture and foldable in fan fashion, each sector-shaped section composed of two half-sections, also sector-shaped, and each entire section folding upon the middle line 8 between the two half-sections. This parachute is located above the flange, the ring and the braces, and the sections thereof are true sectors in shape, being pointed and converging, meeting at their inner ends.

Each sector section has studs 9 at the outer angles thereof, said studs slidably mounted in the guide and supporting ring, whereby the sections, located all in a conical plane when unfolded, will be located close together in parallel vertical planes when folded.

The unfolding is accomplished by pull cords 11, having connection with the free outer angles of the endmost sections and serving to pull these sections to meeting position, at the diametrically opposite side of said annulus or ring, said cords passing within the channel of the outer ring, over guide pulleys 12, and thence downwardly within the stationary tube to a reel 13, hereinafter referred to. During this operation the sections will be unfolded successively, following the endmost sections in opposite directions of movement, to right and left.

A second tube, 14, surrounds the stationary tube, and is mounted to rotate thereupon, may be flanged at its upper and lower ends at 15, 15' and carries an annularly braced vertical-axis screw propeller 16, radial braces $16^2$ rigidly connecting the outer ends of the propeller blades with the flanges.

A third tube, 16', is mounted to rotate upon the second tube, and may be flanged at its upper and lower ends at 17, 17', a second annularly braced vertical-axis screw propeller, 18, much larger in diameter than and located below the first-named propeller, having radial braces 19 rigidly connecting the propeller blades with the flange.

A fourth tube, 20, surrounds the third tube and, through downwardly and outwardly extending supporting rods 21, carries the cage or platform 22, whereon is mounted the motor 23 and the reel 13, hereinbefore referred to.

The motor has driving connection 24 with the second tube, to rotate the same and the upper smaller propeller; and driving connection 25 with the third tube, to rotate the same and the lower or larger propeller, the upper propeller being rotated in the opposite direction and much faster than the lower propeller, the relative speed of rotation of the two propellers being gaged to offset friction and prevent rotation of the fourth tube and of the cage supported thereby.

By shifting the live load or ballast in the cage 22, the machine may be tilted and the propellers utilized for progress in an inclined or in a horizontal direction.

In ascending, the parachute is folded and the two propellers, being respectively large and small, with their wings or blades located one without the other, the downward drafts of air resulting from the two propellers will not interfere with each other.

The folded parachute constitutes an upper stabilizer for the machine, and a lower rudder 26 is hinged to the cage in rear and provided with suitable controlling mechanism.

I claim:

1. In a flying machine, a central vertical support, an annulus connected with said support, a parachute having sector-shaped sections connected at their inner ends to said support and at their outer ends slidably engaging said annulus, said sections connected laterally together, the two adjacent sections at one side of the machine being free and unconnected along their adjacent edges, pull cords connected to the free edges of said adjacent sections, all of said sections being foldable into parallel vertical position and adapted to serve as a guide fin or stabilizer.

2. In a flying machine, a central vertical support, an annulus connected with said support and having an annular channel, a parachute having sector-shaped sections connected at their inner ends to said support and at their outer ends having studs slidably engaging said channel, said sections connected laterally together, the two adjacent sections at one side of the machine being free and unconnected along their adjacent edges, pull cords connected to the free edges of said adjacent sections and engaging said channel, all of said sections being foldable into parallel vertical position and adapted to serve as a guide fin or stabilizer.

3. In a flying machine, a stationary center tube, an annulus supported thereby, a parachute composed of sector-shaped sections having outer studs slidably mounted in said annulus, said sections foldable from normal position in oppoiste directions to one side of the machine into compact vertical form, a second tube surrounding the center tube and rotatable thereupon, a vertical-axis screw propeller carried by said second tube, a third tube rotatably mounted upon the second tube, a vertical-axis screw propeller carried by said third tube, a fourth tube carried by said third tube, a cage suspended from said fourth tube, a motor upon said cage having driving connections with the two propellers to rotate the same in opposite directions, and a reel mounted upon the cage and having connections with opposite sides of the parachute to unfold the same.

In testimony whereof I affix my signature. in presence of two witnesses.

GEORGE ROBERTSON.

Witnesses:
 A. R. MOLLETTE,
 R. S. CLEMENTS.